(12) United States Patent
Takahashi

(10) Patent No.: US 9,083,824 B2
(45) Date of Patent: Jul. 14, 2015

(54) IMAGE FORMING APPARATUS FOR DETECTING AN ABNORMALITY

(71) Applicant: CANON KABUSHIKI KAISHA, Tokyo (JP)

(72) Inventor: Keita Takahashi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/224,658

(22) Filed: Mar. 25, 2014

(65) Prior Publication Data

US 2014/0293316 A1    Oct. 2, 2014

(30) Foreign Application Priority Data

Mar. 29, 2013 (JP) ................. 2013-073276

(51) Int. Cl.
| | | |
|---|---|---|
| G06K 15/00 | (2006.01) | |
| H04N 1/00 | (2006.01) | |
| H04N 1/32 | (2006.01) | |
| G06F 3/12 | (2006.01) | |

(52) U.S. Cl.
CPC ....... *H04N 1/00082* (2013.01); *H04N 1/00015* (2013.01); *H04N 1/00037* (2013.01); *H04N 1/00076* (2013.01); *H04N 1/00891* (2013.01); *H04N 1/00925* (2013.01); *H04N 1/32593* (2013.01); *H04N 1/00472* (2013.01); *H04N 2201/0094* (2013.01)

(58) Field of Classification Search
CPC .......... H04N 1/00082; H04N 1/00925; H04N 1/00891; H04N 1/00076; H04N 1/32593; H04N 1/00472

See application file for complete search history.

(56) References Cited

U.S. PATENT DOCUMENTS

| | | | |
|---|---|---|---|
| 6,885,469 B1 * | 4/2005 | Tanimoto | 358/1.14 |
| 2002/0118383 A1 * | 8/2002 | Kamiya | 358/1.13 |
| 2008/0077725 A1 * | 3/2008 | Yabuki | 710/305 |
| 2014/0176975 A1 * | 6/2014 | Kobayashi et al. | 358/1.13 |

FOREIGN PATENT DOCUMENTS

JP    2002-254781 A    9/2002

* cited by examiner

*Primary Examiner* — Dov Popovici
(74) *Attorney, Agent, or Firm* — Canon USA Inc. IP Division

(57) ABSTRACT

An image forming apparatus capable of selectively executing a plurality of functions includes a first control unit for transmitting an image forming job, a second control unit for receiving the image forming job transmitted from the first control unit and controlling an image forming operation, an abnormality detection unit for detecting an abnormality of the image forming apparatus, a function restriction unit for restricting a function corresponding to the detected abnormality, and an execution unit for executing a first preparation operation if a power of the second control unit is turned on while the function is not restricted by the function restriction unit, and for executing, if the power of the second control unit is turned on while the function is restricted by the function restriction unit, a second preparation operation in which a preparation operation corresponding to the restricted function is excluded from the first preparation operation.

9 Claims, 12 Drawing Sheets

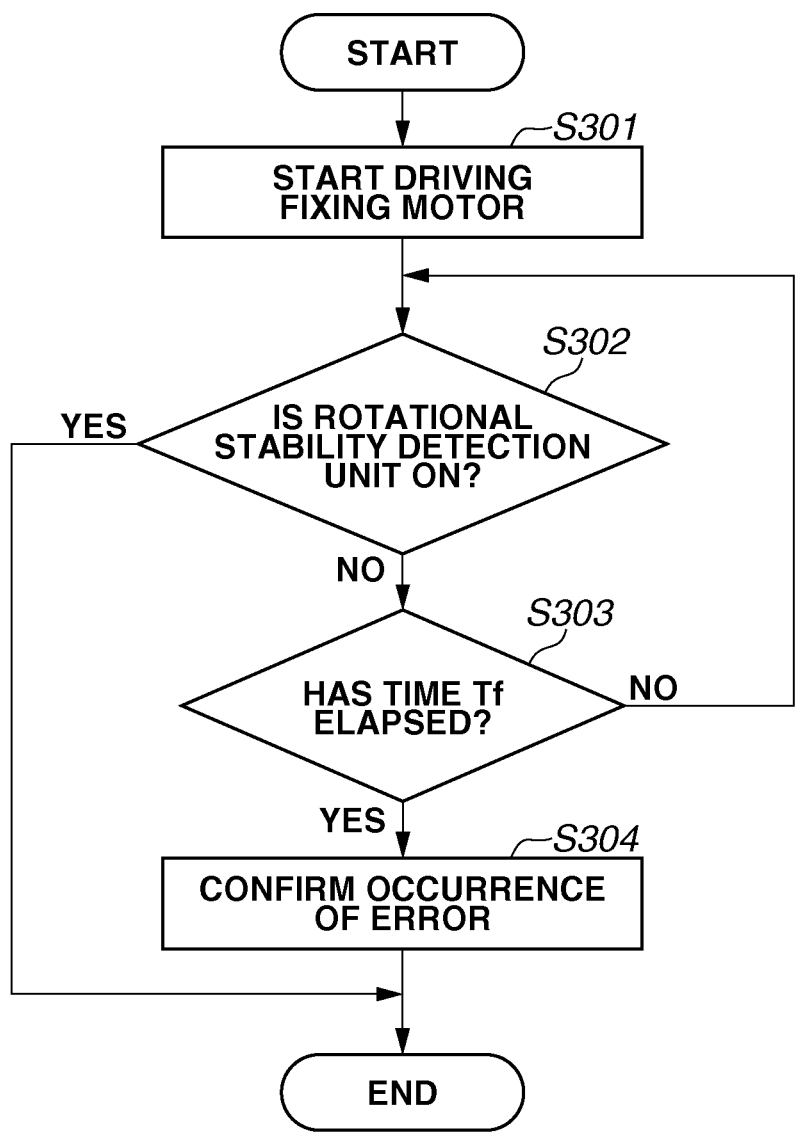

IMAGE FORMING APPARATUS FOR DETECTING AN ABNORMALITY

BACKGROUND OF THE INVENTION

1. Field of the Invention

The present disclosure generally relates to image forming and, more particularly, to an image forming apparatus which forms an image on a sheet.

2. Description of the Related Art

Conventionally, there has been provided an image forming apparatus exemplified by a multifunction printer (hereinafter referred to as an MFP) that includes a scanning function for reading an image from a document and a printing function for printing a scanned image on a sheet. A lamp lighting error and a motor error are examples of the failure states for the scanning function of the MFP. Further, abnormality in a fixing unit and abnormality in an intermediate transfer member are examples of the failure states for the printing function thereof.

In a case where the above failure has occurred in the conventional MFP, the MFP sends an error code (E-code) corresponding to that failure to an external computer in a remote place, so as to inform a service office of that external computer in the remote place that repair work performed by a service engineer may be necessary.

In such a case, the functions of the conventional MFP is suspended entirely even if the E-code is generated for the failure that has occurred in a part of the functions such as a scanning function. Therefore, even a job such as a function for selecting and printing a scanned image previously stored in a hard disk of the MFP, which does not use the scanning function, cannot be executed. Further, a function for simply printing the print data transmitted from the external computer to the MFP cannot be executed as well.

Accordingly, when the failure has occurred in the scanning function of the MFP, even if the service office in the remote place has been informed of the occurrence of the failure, the MFP will have a downtime. During the downtime, the printing operation cannot be executed until the service engineer visits the installation site of the MFP to complete the repair work.

In order to solve the above problems, Japanese Patent Application Laid-Open No. 2002-254781 discusses a technique which restricts a function having an abnormality while enabling the rest of functions even if the abnormality has occurred in a part of the functions.

Conventionally, the MFP has been provided with a power saving mode (sleep mode) function. In recent years, because there has been an increased demand in the MFP with an improved power saving mode function, there has been realized an excellent power-saving effect by promptly shifting to the sleep mode when the MFP is not in use.

Consequently, there is also a need to realize a function for shifting to the sleep mode from a function restriction state in case of the abnormality. Furthermore, in the recent sleep mode, there has been realized the power saving performance approximately the same as that in the power off period by shutting off the power supply to the unnecessary portions.

However, because the operation for returning from the sleep mode is regarded as the same as the normal power on operation, a preparation operation for the MFP will be executed when the MFP returns from the sleep mode. Therefore, when the MFP returns from the sleep mode in the function restriction state, the failure of the portion having an abnormality may get worse or another failure may occur in other parts if the same preparation operation as in a non-error state is executed.

For example, when a fixing motor that rotates a fixing unit of the MFP cannot rotate properly, the failure may occur in a heating member of the fixing unit if the preparation operation of the fixing unit for the return period from the sleep mode is executed repeatedly. Naturally, in a case where the failure gets worse or occurs in other parts, a user will be requested to have a longer period of downtime than that for repairing the error that has initially occurred.

Furthermore, due to the above-described situation in which the MFP shifts to the sleep mode more frequently in order to save power, there is a high risk in which the failure gets worse or occurs in other parts, and thus the downtime thereof will be longer.

SUMMARY OF THE INVENTION

Therefore, the present disclosure is directed to an image forming apparatus capable of preventing a failure from getting worse while preventing another failure in other parts, even if the power is input thereto in a function restriction state.

According to an aspect of the present disclosure, an image forming apparatus includes a first control unit configured to transmit an image forming job, a second control unit configured to receive the image forming job transmitted from the first control unit and to control an image forming operation, an abnormality detection unit configured to detect an abnormality of the image forming apparatus, a function restriction unit configured to restrict, among a plurality of functions, a function corresponding to the abnormality detected by the abnormality detection unit, and an execution unit configured to execute a first preparation operation in a case where a power of the second control unit is turned on when the function is not restricted by the function restriction unit, and to execute, in a case where the power of the second control unit is turned on when the function is restricted by the function restriction unit, a second preparation operation in which a preparation operation corresponding to the restricted function is excluded from the first preparation operation.

Further features of the present disclosure will become apparent from the following description of exemplary embodiments with reference to the attached drawings.

BRIEF DESCRIPTION OF THE DRAWINGS

FIG. 3 is a flowchart illustrating abnormality detection processing.

DESCRIPTION OF THE EMBODIMENTS

Exemplary embodiments of the present disclosure will be described below in detail with reference to the drawings. However, the dimensions, materials, shapes, relative positions, etc., of structural components discussed in the exemplary embodiments may be changed when necessary in accordance with the structure of an apparatus to which the present disclosure is applied and various conditions. Therefore, they are not meant to limit the scope of the disclosure to the forms discussed below.

Figure 1:
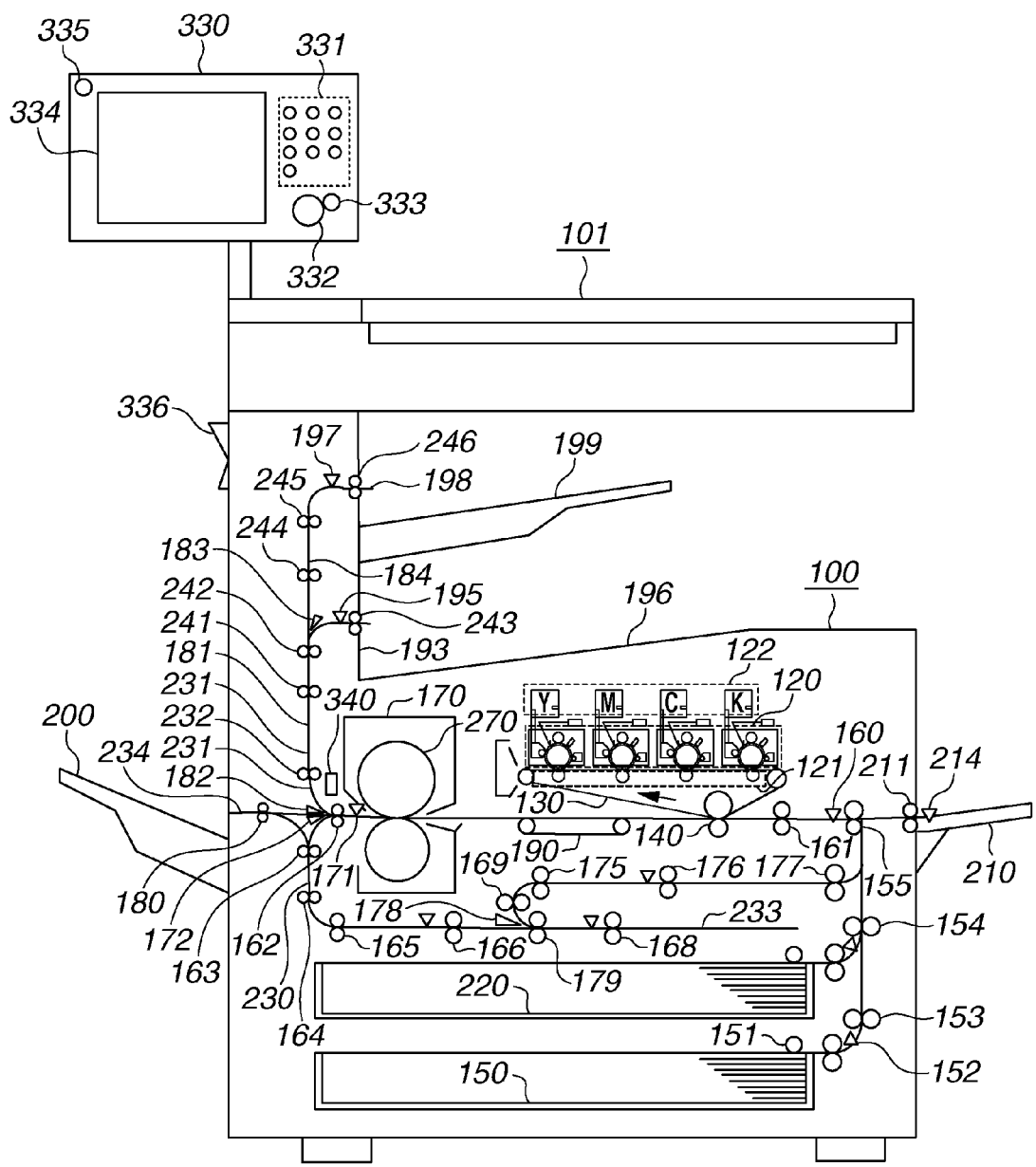
FIG. 1 is a diagram illustrating a general configuration of an image forming apparatus.
Figure 2:
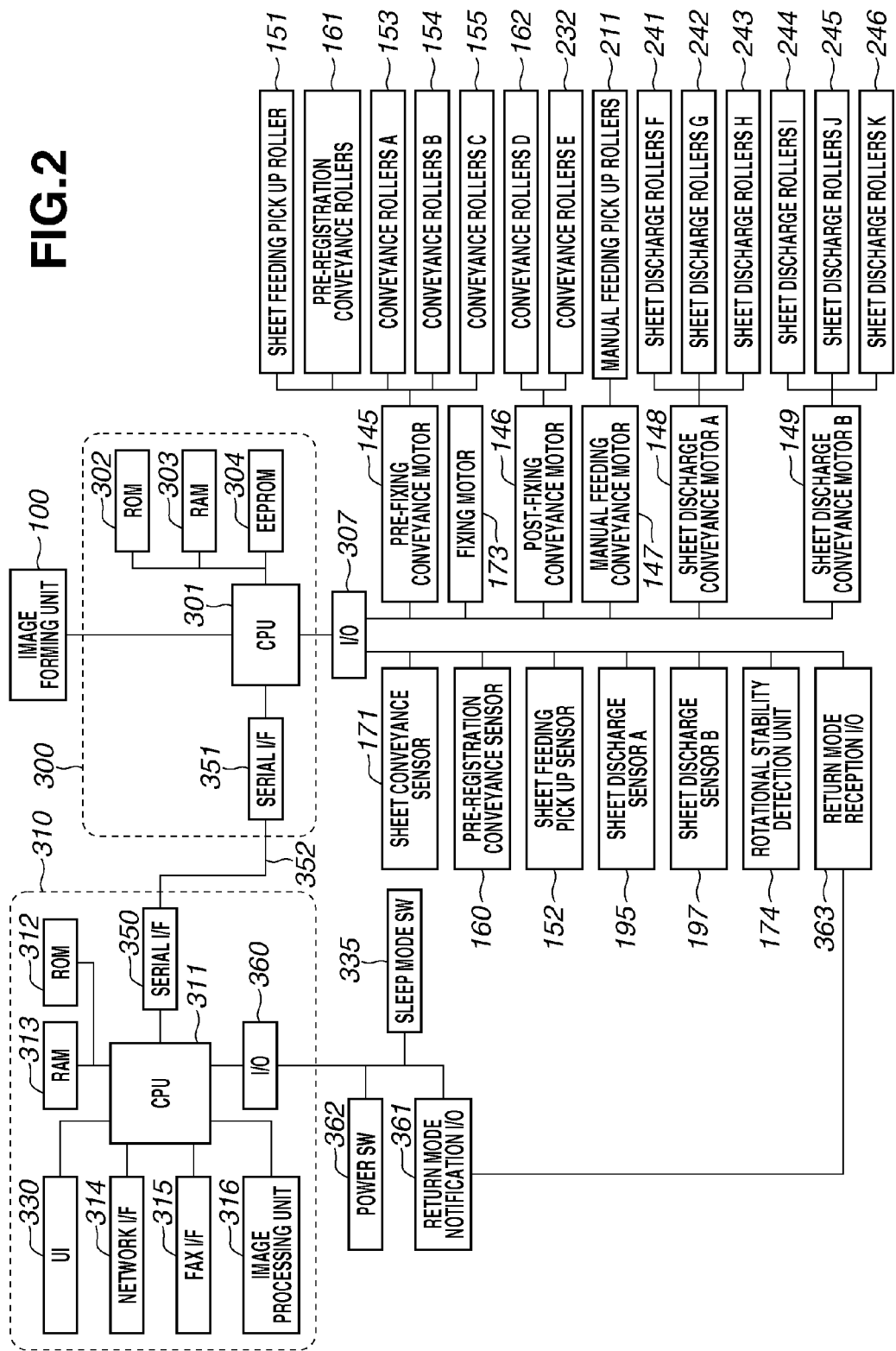
FIG. 2 is a diagram illustrating a control block.

FIG. 1 is a diagram illustrating a general configuration of an image forming apparatus. FIG. 2 is a diagram illustrating a control block. A basic configuration will be described with reference to FIGS. 1 and 2. The image forming apparatus includes a printer unit 100 and a scanner unit 101, and is capable of selectively executing a plurality of functions such as a copying function, a printing function, and a scanning transmission function.

In FIG. 2, a control unit 300 includes a CPU 301, a read-only memory (ROM) 302, a random access memory (RAM) 303, an electrically erasable programmable read-only memory (EEPROM) 304, and a serial interface (I/F) 351. Further, a control unit 310 includes a CPU 311, a ROM 312, a RAM 313, and a serial I/F 350. The control unit 300 and the control unit 310 are connected to each other via a communication line 352. As used herein, the term "unit" generally refers to any combination of software, firmware, hardware, or other component that is used to effectuate a purpose.

When an instruction (hereinafter referred to as a "job") for starting a printing operation, for example, is input to the CPU 311 via an operation unit such as a user interface (UI) 330, the CPU 311 issues the instruction for starting the printing operation to the serial I/F 351 of the CPU 301 of the control unit 300 via the serial I/F 350.

The CPU 301 is configured so as to be capable of driving and controlling a pre-fixing conveyance motor 145, a fixing motor 173, a post-fixing conveyance motor 146, a manual feeding conveyance motor 147, a sheet discharge conveyance motor A 148, and a sheet discharge conveyance motor B 149, all of which are connected thereto via an input-output (I/O) 307. Further, the CPU 301 can detect input signals from a sheet conveyance sensor 171, a pre-registration conveyance sensor 160, a sheet feeding pick up sensor 152, sheet discharge sensors 195 and 197, and the like, via the I/O 307.

The CPU 311 is configured so as to be capable of receiving an image forming job input via a network I/F 314 or a fax I/F 315. Further, the CPU 311 includes an image processing unit 316 for processing an image of the input job. The CPU 311 performs image processing such as rasterization or rotation of the image, and sends a notification to the CPU 301 via the serial I/F 350.

The CPU 301 is configured so as to be capable of controlling the printer unit 100. As illustrated in FIG. 1, an image forming unit 320 includes a process unit 120, a transfer belt 130, a secondary transfer portion 140, a laser scanner unit 122, and a fixing unit 170.

A power switch (SW) 362 serves as a power switch for the respective loads controlled by the control unit 300, and the CPU 311 can arbitrarily turn on and off the power SW 362 via an I/O 360. The power SW 362 cannot be operated by a user. Further, a return mode notification I/O 361 of the control unit 310 is directly connected to a return mode reception I/O 363 of the control unit 300 via a signal line. The scanner unit 101 is an apparatus for reading a document when a copying operation is executed. A main power SW 336 serves as a power switch for turning on and off the entire image forming apparatus.

Next, a basic image forming operation will be described. When a job is input via the UI 330, the CPU 311 interprets the job and instructs the CPU 301 to perform a printing operation. The CPU 301 drives and rotates a sheet feeding pick up roller 151 by driving the pre-fixing conveyance motor 145 via the I/O 307, so that the sheets within a sheet feeding cassette 150 are fed and conveyed one by one. At this time, the CPU 301 uses the sheet feeding pick up sensor 152 to monitor whether a feeding operation of the sheets has been performed normally.

Similarly, an operation for conveying the sheets from a manual feeding tray 210 will be described. In a state where the sheets are placed on the manual feeding tray 210, the CPU 301 drives the manual feeding conveyance motor 147 via the I/O 307 when an instruction for conveying the sheets from the manual feeding tray 210 is input via the UI 330. With this operation, a manual feeding pick up rollers 211 rotates and feeds the sheets placed on the manual feeding tray 210 one by one.

In the same manner as that in the operation for feeding the sheets from the sheet feeding cassette 150, the CPU 301 monitors the pre-registration conveyance sensor 160 to determine whether the feeding operation has been performed normally. In addition, there is provided a manual feeding sheet presence sensor 214 for determining whether the sheets are placed on the manual feeding tray 210.

On the other hand, the CPU 301 causes the process unit 120 to start the image forming operation while adjusting the timing thereof with the timing of the sheet arriving at the secondary transfer portion 140. The process unit 120 includes a photosensitive drum, a development unit, a charging roller, and a photosensitive drum cleaner.

In the process unit 120, after a surface of the photosensitive drum is charged, a latent image is formed on the photosensitive drum caused by a laser emitted from the laser scanner unit 122. Then, the formed latent image is developed on the photosensitive drum with toner stored in the development unit. Thereafter, a primary transfer bias is applied to the toner image developed on the photosensitive drum at a primary transfer portion 121, and the toner image is transferred onto the transfer belt 130. The toner image transferred onto the transfer belt 130 is conveyed to the secondary transfer portion 140 by the rotation of the transfer belt 130.

Further, the CPU 301 monitors the pre-registration conveyance sensor 160 to detect the position of the sheet conveyed by conveyance rollers A 153, conveyance rollers B 154, and conveyance rollers C 155. Then, based on the timing at which a leading end of the sheet has reached the pre-registration conveyance sensor 160, the CPU 301 controls the conveyance of the sheet to cause the leading end of the sheet to match a leading end of the toner image on the transfer belt 130 at the secondary transfer portion 140. For example, in a case where the sheet has reached earlier than the toner image, the CPU 301 causes the sheet to stop for a predetermined time at pre-registration conveyance rollers 161, and restarts the conveyance operation.

Thereafter, a secondary transfer bias is applied to the sheet and the toner image that have reached the secondary transfer portion 140, so that the toner image is transferred to the sheet.

After the secondary transfer processing, the sheet is conveyed to a conveyance belt 190, so as to be conveyed to the fixing unit 170. Then, the toner image on the sheet is heated and fixed thereon by the fixing unit 170.

When the leading end of the sheet on which the fixing processing has been performed reaches the sheet conveyance sensor 171, the CPU 301 determines whether to convey the sheet to any of a conveyance path A 230, a conveyance path B 231, or a conveyance path C 234 according to the job content previously instructed via the UI 330. Then, the CPU 301 switches the conveyance destination of the sheet, which is conveyed by a conveyance roller 162, by switching a switching member A 172 and a switching member B 182.

Specifically, the CPU 301 controls the switching member A 172 and the switching member B 182 according to the instructed job contents such as whether to perform one-sided printing or two-sided printing, whether to discharge the sheet to any of a sheet discharge portion A 200, a sheet discharge portion B 196, or a sheet discharge portion C 199.

The sheet that has been conveyed to the conveyance path B 231 is further conveyed to the downstream thereof by conveyance rollers E 232. Subsequently, the sheet is conveyed to a conveyance path D 181, so as to be conveyed in the direction of the sheet discharge portion B 196 or the sheet discharge portion C 199. The sheet conveyed to the conveyance path D 181 is conveyed by sheet discharge rollers F 241, sheet discharge rollers G 242, and sheet discharge rollers H 243, all of which are driven by the sheet discharge conveyance motor A 148.

If the CPU 301 is instructed to discharge the sheet to the sheet discharge portion B 196, the CPU 301 switches a switching member 183 to convey the sheet to a conveyance path 193 and discharges the sheet to the sheet discharge portion B 196. If the CPU 301 is instructed to discharge the sheet to the sheet discharge portion C 199, the CPU 301 switches the switching member 183 to a conveyance path 184. Then, the sheet is conveyed by sheet discharge rollers I 244, sheet discharge rollers J 245, and sheet discharge rollers K 246, all of which are driven by the sheet discharge conveyance motor B 149, so as to be discharged to the sheet discharge portion C 199.

In a case where two-sided printing is performed on the sheet, the sheet is conveyed to the conveyance path A 230, so as to be conveyed to a two-sided reversing conveyance path D 233 by two-sided conveyance rollers A 164, two-sided conveyance rollers B 165, two-sided conveyance rollers C 166, two-sided conveyance rollers D 179, and two-sided conveyance rollers E 168. Then, when a rear end of the sheet has passed via the two-sided conveyance rollers D 179, the CPU 301 switches a switching member 178 in the direction of two-sided conveyance rollers F 169, and causes the respective rollers to rotate in the reverse direction. Thereafter, the sheet is conveyed by the two-sided conveyance rollers F 169, two-sided conveyance rollers G 175, two-sided conveyance rollers H 176, and two-sided conveyance rollers I 177, so as to be conveyed to and received by the conveyance rollers C 155.

When the entire job has been completed, the CPU 301 informs the CPU 311 of completion of the job. Further, the above-described basic image forming operation is merely an example, and thus the present disclosure is not limited to the above configuration.

FIG. 3 is a flowchart illustrating abnormality detection processing. A program for executing the flowchart is stored in the ROM 302 so that the program is read and executed by the CPU 301.

In this flowchart, processing for detecting the abnormality of the fixing motor 173 will be described. In the present exemplary embodiment, a direct-current (DC) motor is employed as the fixing motor 173, and the CPU 301 determines whether an error has occurred therein by causing a rotational stability detection unit 174 to detect the rotational stability.

When the job is started, in step S301, the CPU 301 starts driving the fixing motor 173. Then, in step S302, the CPU 301 determines whether the rotational stability detection unit 174 is turned on. In a case where the rotational stability detection unit 174 is turned on (YES in step S302), the CPU 301 determines that the fixing motor 173 is rotating stably, and ends the processing of the flowchart.

On the other hand, in a case where the rotational stability detection unit 174 is not turned on (NO in step S302), the processing proceeds to step S303. In step S303, the CPU 301 determines whether the rotation time of the fixing motor 173 exceeds time Tf. In a case where the rotation time thereof does not exceed the time Tf (NO in step S303), the processing returns to step S302. On the other hand, in a case where the rotation time of the fixing motor 173 exceeds the time Tf (YES in step S303), the processing proceeds to step S304. In step S304, the CPU 301 fixes the occurrence of the error based on the state that the fixing motor 173 does not rotate stably, and ends the processing of the flowchart.

Figure 4A:
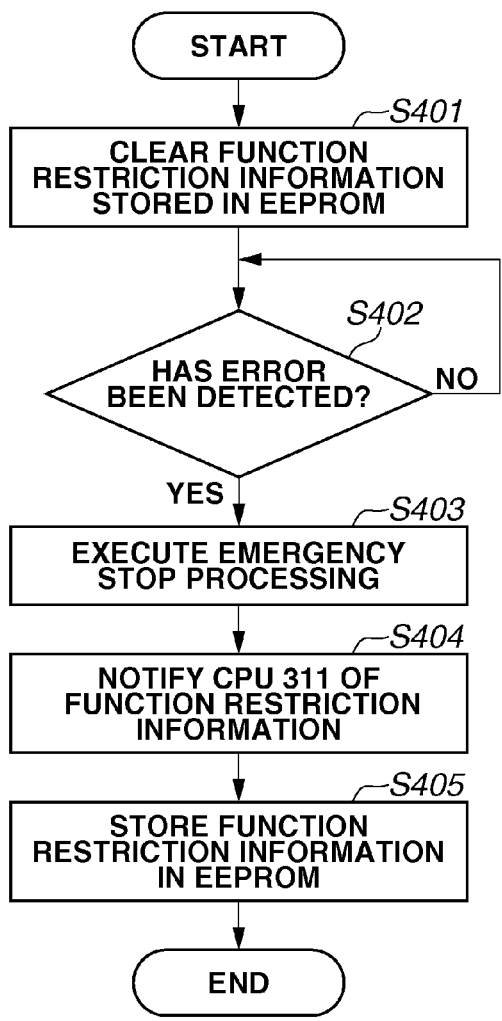
FIG. 4A is a flowchart illustrating processing executed by a central processing unit (CPU) for shifting to a function restriction state.

FIG. 4A is a flowchart illustrating processing executed by the CPU 301 for shifting to a function restriction state. A program for executing the flowchart is stored in the ROM 302 so that the program is read and executed by the CPU 301.

First, in step S401, the CPU 301 clears function restriction information stored in the EEPROM 304. Next, in step S402, the CPU 301 wait until any error has been detected. In a case where the error has been detected (YES in step S402), the processing proceeds to step S403. In step S403, by taking the safety of respective units into consideration, the CPU 301 executes emergency stop processing. The emergency stop processing refers to processing for forcibly turning off the heater of the fixing unit 170 or stopping the sheet conveyance control, which is performed when abnormalities have occurred.

Next, in step S404, the CPU 301 informs the CPU 311 via the serial I/F 351 that the image forming apparatus has shifted to the function restriction state. Thereafter, in step S405, the CPU 301 writes the function restriction information into the EEPROM 304 and ends the processing of the flowchart.

Figure 4B:
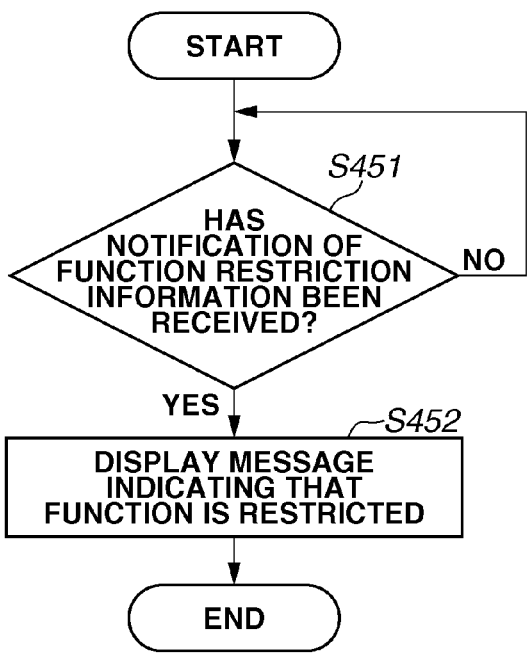
FIG. 4B is a flowchart illustrating processing executed by another CPU for shifting to the function restriction state.

FIG. 4B is a flowchart illustrating processing executed by the CPU 311 for shifting to the function restriction state. A program for executing the flowchart is stored in the ROM 312 so that the program is read and executed by the CPU 311.

First, in step S451, the CPU 311 waits until the notification of the function restriction information is received from the CPU 301. In a case where the notification of the function restriction information is received from the CPU 301 (YES in step S451), the processing proceeds to step S452. In step S452, the CPU 311 causes the UI 330 to display a message indicating that the image forming apparatus has shifted to the function restriction state, and ends the processing of the flowchart.

Figure 5:
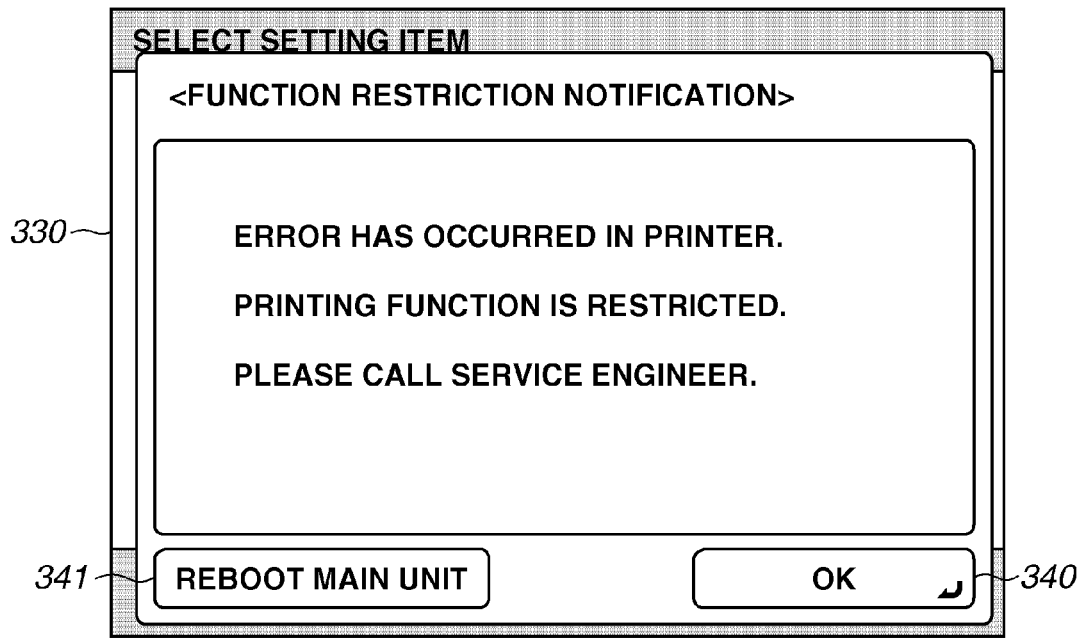
FIG. 5 is a diagram illustrating a user interface (UI) screen displayed when the image forming apparatus has shifted to the function restriction state.

FIG. 5 is a diagram illustrating a screen displayed on the UI 330 in the above-described state. In a case where a reboot main unit button 341 is pressed, reboot processing will be performed. On the other hand, in a case where an OK button 340 is pressed, the image forming apparatus will shift to the function restriction state.

Figure 6:
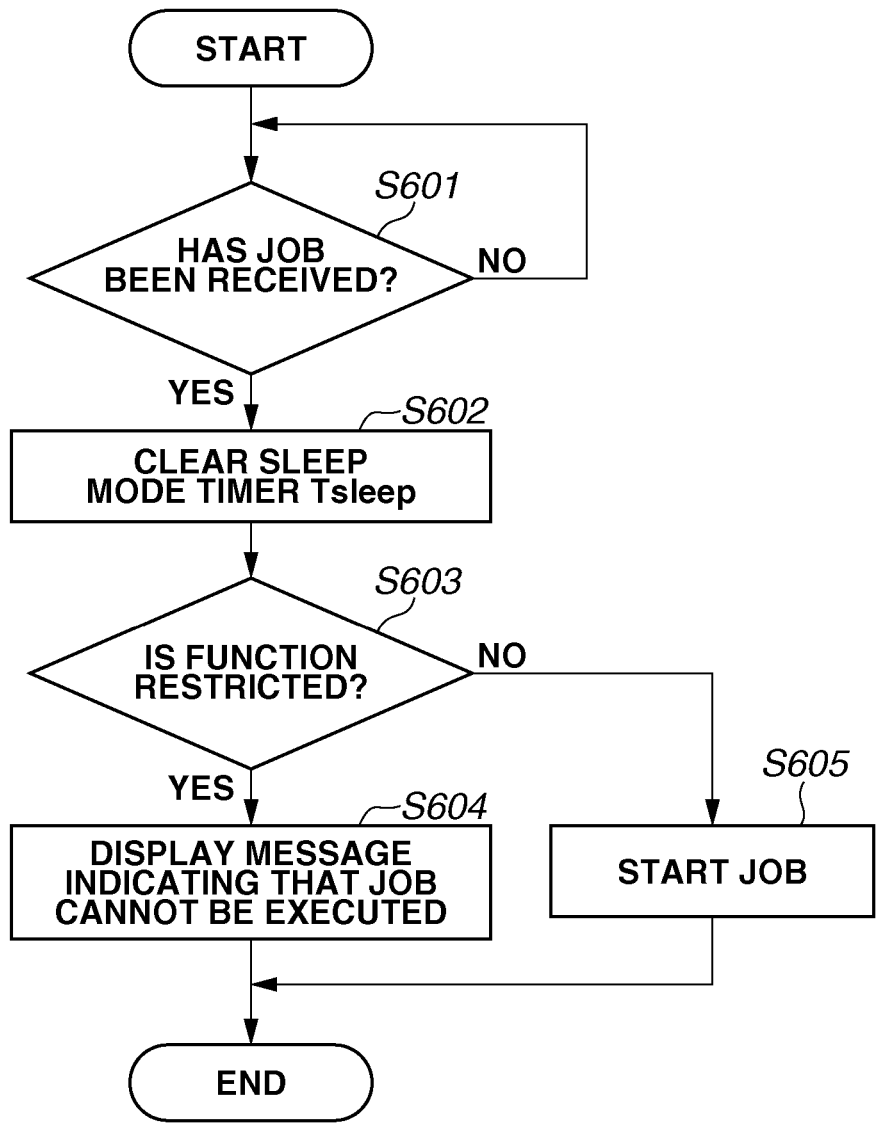
FIG. 6 is a flowchart illustrating processing performed when the image forming apparatus has received a job in the function restriction state.

FIG. 6 is a flowchart illustrating the processing performed when the CPU 311 has received a job via the UI 330 or the network I/F 314 in the function restriction state. A program for executing the flowchart is stored in the ROM 312 so that the program is read and executed by the CPU 311.

First, in step S601, the CPU 311 waits until the job has been received. In a case where the CPU 311 has received the job via the UI 330 or the network I/F 314 (YES in step S601), the processing proceeds to step S602. In step S602, the CPU 311 clears a sleep mode timer Tsleep and starts the time count.

In the sleep mode, the power supply to the CPU 301 is shut off while maintaining the power supply to the CPU 311. The CPU 311 uses the sleep mode timer Tsleep to determine whether to cause the image forming apparatus to shift to the sleep mode. Processing for shifting to the sleep mode will be described below in detail.

Next, in step S603, the CPU 311 determines whether function used for the job is restricted. In a case where the function therefor is not restricted (NO in step S603), the processing proceeds to step S605. In step S605, the CPU 311 starts the job. In a case where the function therefor is restricted (YES in step S603), the processing proceeds to step S604. In step S604, the CPU 311 causes the UI 330 to display a message indicating that the job cannot be executed, and ends the processing of the flowchart.

Figure 7:
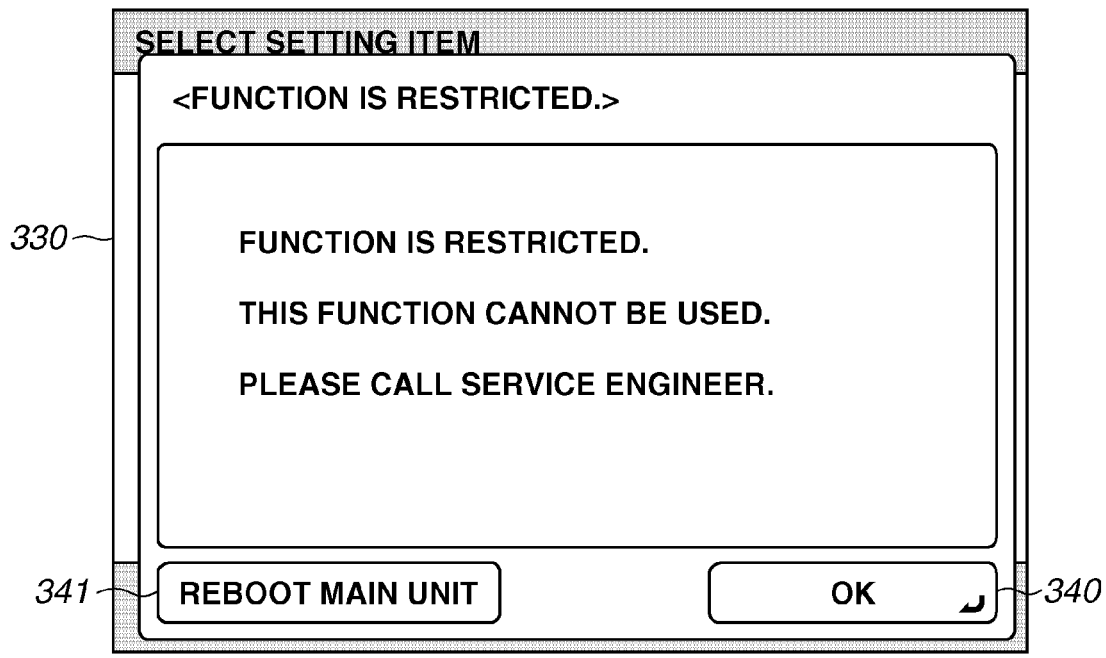
FIG. 7 is a diagram illustrating a UI screen displayed when the image forming apparatus has received a job in the function restriction state.

FIG. 7 is a diagram illustrating a screen displayed on the UI 330 in the above-described state. The correlation between the function restricted portions and the functions that can be provided as the image forming apparatus will be described with reference to Table 1.

Figure 8:
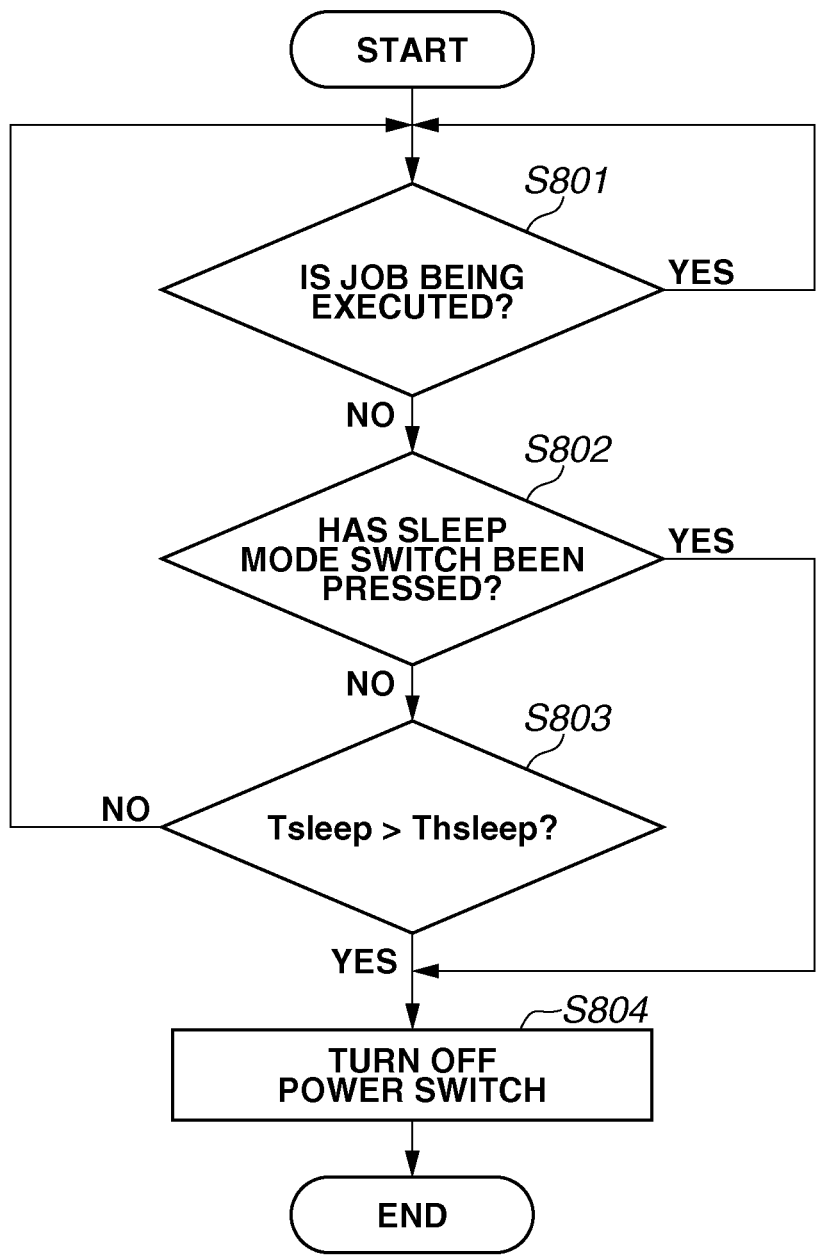
FIG. 8 is a flowchart illustrating an operation for causing the image forming apparatus to enter a sleep mode.

FIG. 8 is a flowchart illustrating an operation for causing the image forming apparatus to enter the sleep mode (power saving mode). A program for executing the flowchart is stored in the ROM 312 so that the program is read and executed by the CPU 311.

First, in step S801, the CPU 311 determines whether the job is being executed. In a case where the job is being executed (YES in step S801), the CPU 311 waits until the job is completed and advances the processing to step S802. After the job has been completed (NO in step S801), in step S802, the CPU 311 determines whether a sleep mode SW 335 is pressed. In a case where the sleep mode SW 335 is pressed (YES in step S802), the processing proceeds to step S804.

In a case where the sleep mode SW 335 is not pressed (NO in step S802), the processing proceeds to step S803. In step S803, the CPU 311 determines whether a count value Tsleep of the sleep mode timer exceeds a predetermined time Thsleep. In a case where the count value Tsleep is equal to or less than the predetermined time Thsleep (Tsleep≤Thsleep) (NO in step S803), the processing returns to step S801.

When the job is started in step S601 of FIG. 6, the sleep mode timer Tsleep will be cleared. In other words, if the CPU 311 does not receive the job before the time Thsleep has elapsed after the sleep mode timer starts counting the time, the image forming apparatus will shift to the sleep mode.

Therefore, in a case where the CPU 311 determines that the count value Tsleep is greater than the predetermined time

TABLE 1

| | | FUNCTIONS | | | |
| --- | --- | --- | --- | --- | --- |
| | | COPYING | PRINTING | SCANNING TRANSMISSION | SCANNING STORAGE |
| FUNCTION RESTRICTED PORTIONS | PRINTER UNIT | NA | NA | OK | OK |
| | SCANNER UNIT | NA | OK | NA | NA |
| | NETWORK | OK | NA | NA | OK |

In the copying function, a document scanned by the scanner unit 101 is printed by the printer unit 100. In the printing function, print data received via the network I/F 314 is printed by the printer unit 100. In the scanning transmission function, the document scanned by the scanner unit 101 is transmitted to an external computer via the network I/F 314 as digital data. In the scanning storage function, the document scanned by the scanner unit 101 is stored in the RAM 313 or a hard disk drive (HDD)(not illustrated) of the image forming apparatus.

If the printer unit 100 becomes the function restriction state, the copying function and the printing function are unavailable because the printing operation cannot be executed. On the other hand, the scanning transmission function and the scanning storage function are available because the printing operation does not have to be executed. On the contrary, if the scanner unit 101 becomes the function restriction state, only the printing function, which can be used without scanning the document, is available although the other functions cannot be used.

Furthermore, if the network I/F 314 becomes the function restriction state, the copying function and the scanning storage function, which do not require communication with the external devices, are available although the other functions are unavailable. As described above, the screen illustrated in FIG. 7 will be displayed when the content of the received job cannot be executed because the function used therefor is restricted.

Thsleep (Tsleep>Thsleep) (YES in step S803), the CPU 311 advances the processing to step S804. Then, in step S804, the CPU 311 turns off the power SW 362. With this operation, the CPU 311 shuts off the power supply to the respective loads controlled by the control unit 300 and the CPU 301 to cause the image forming apparatus to shift to the sleep mode, and ends the processing of the flowchart.

Figure 9:
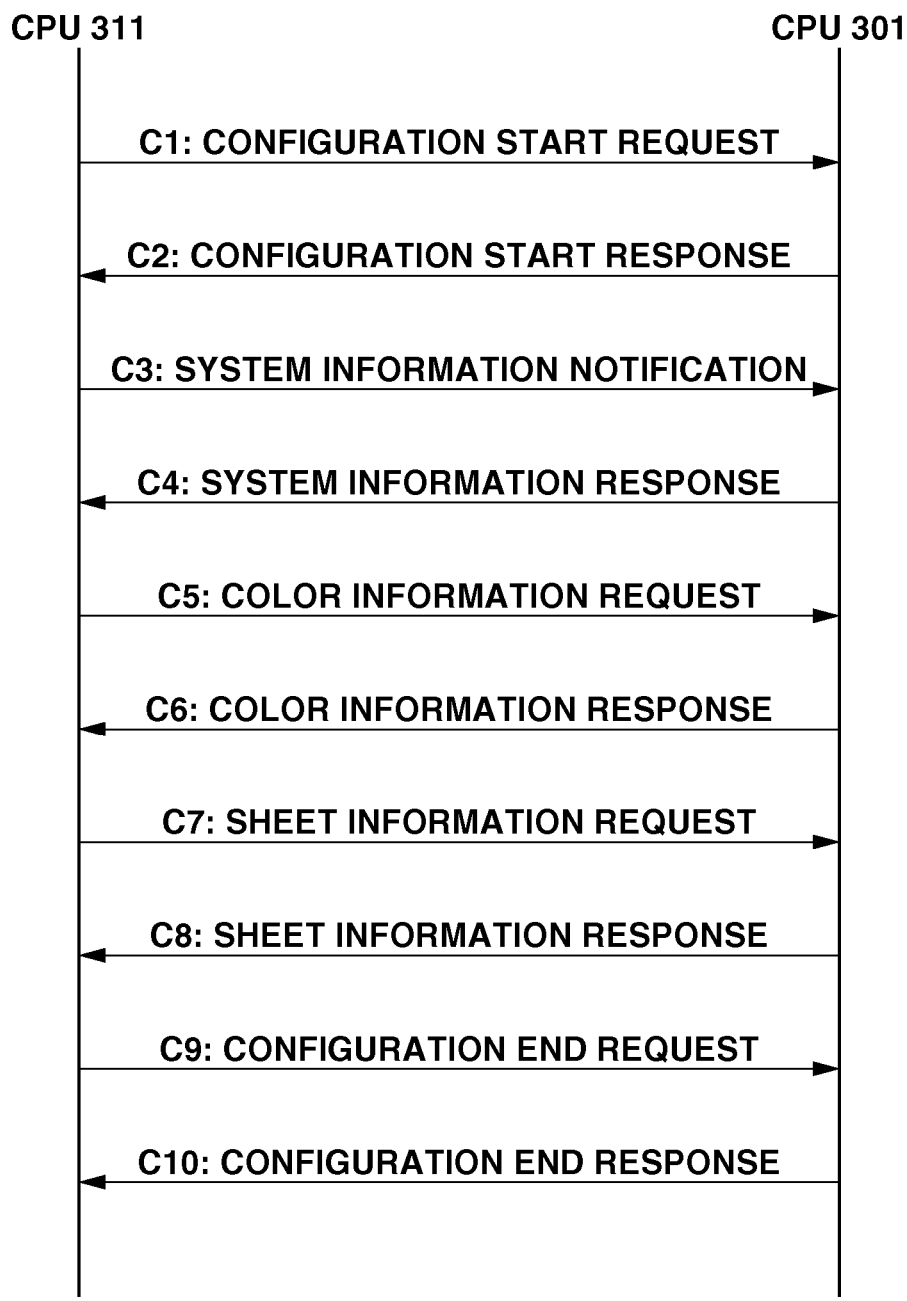
FIG. 9 is a sequence diagram of configurations.

FIG. 9 is a sequence diagram of the configuration executed by the CPU 301 and the CPU 311 when the power is turned on or the image forming apparatus returns from the sleep mode. The CPU 301 and the CPU 311 are configured to operate as a system by sharing the information with each other through the configuration.

A configuration start request C1 is a communication command for the CPU 311 to inform the CPU 301 that the configuration is started. The CPU 301 receives the configuration start request C1 and notifies the CPU 311 of a configuration start response C2. The CPU 311 receives the configuration start response C2 and notifies the CPU 301 of a system information notification C3.

Through the system information notification C3, the notification of characteristics of the image forming apparatus such as productivity and printer resolution are sent. The CPU 301 receives the system information notification C3 and performs image formation according to the characteristics thereof.

Further, after the CPU 311 has received a system information response C4, the CPU 311 notifies the CPU 301 of a color information request C5. The color information request C5 is a command for notifying the CPU 311 of the color information included in the printer unit 100. For example, when the image forming apparatus is a full-color image forming apparatus, the CPU 301 sends a color information response C6 to notify the CPU 311 of that the image forming unit 100 supports four colors including yellow (Y), magenta (M), cyan (C) and black (K).

Next, the CPU 301 is notified of a sheet information request C7. Through the sheet information request C7, the CPU 311 requests the information on the sheet feeding cassette 150 and a sheet feeding cassette 220 included in the printer unit 100. Accordingly, the CPU 301 notifies the CPU 311 of the sheet information, for example, information on a sheet size and a remaining amount of the sheets, through a sheet information response C8.

Finally, the configuration will be completed when the CPU 311 notifies the CPU 301 of a configuration end request C9 while the CPU 301 responds thereto with a configuration end response C10.

Next, content of the preparation operation that is to be executed when the power is turned on or the image forming apparatus returns from the sleep mode will be described with reference to Table 2. The function restriction state will be described by taking the printer unit 100 as an example of the function restricted portion.

TABLE 2

| | HIGH-VOLTAGE CHECKING | HIGH-VOLTAGE ADJUSTMENT | DEVELOPMENT UNIT INITIAL ROTATION | FIXING UNIT STARTUP |
|---|---|---|---|---|
| NORMAL STATE | OK | OK | OK | OK |
| FUNCTION RESTRICTION STATE | NA | NA | NA | NA |

The high-voltage checking is an operation for checking whether the high-voltages of the process unit 120, the transfer belt 130, and the secondary transfer portion 140 are output correctly. After executing the high-voltage checking, the high-voltage adjustment is executed. The high-voltage adjustment is an operation for determining and adjusting the output of the high-voltage according to the environment.

Next, the development unit initial rotation is an operation for stirring the toner within the development unit. Further, the fixing unit startup is an operation for making the fixing unit 170 be capable of executing the job by supplying power to the heater of the fixing unit 170 to adjust the temperature of the fixing unit 170.

The above-described preparation operations will be executed when the power is turned on in a usual manner, or when the image forming apparatus returns from the sleep mode. However, if the above preparation operations are executed in the function restriction state being caused by the abnormalities of the printer unit 100, for example, if power is supplied to the heater even though the fixing motor 173 does not activate due to the abnormalities, a fixing unit roller 270 may possibly be fused with an excessive heat.

Figure 10:
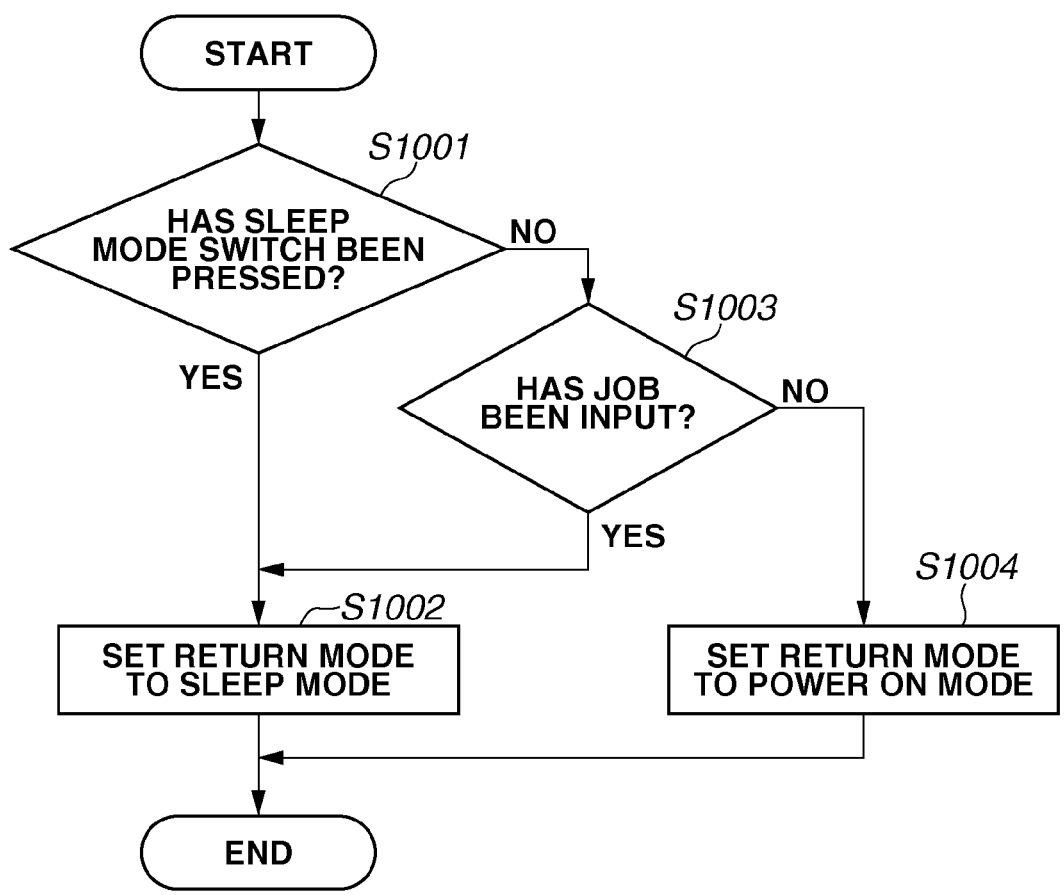
FIG. 10 is a flowchart illustrating processing for determining a return mode.

FIG. 10 is a flowchart illustrating processing executed by the CPU 311 for determining a return mode. A program for executing the flowchart is stored in the ROM 312 so that the program is read and executed by the CPU 311.

First, in step S1001, the CPU 311 determines whether the sleep mode SW 335 has been pressed. In a case where the sleep mode SW 335 has been pressed (YES in step S1001), the processing proceeds to step S1002. In step S1002, the CPU 311 determines the return mode to be a second return mode.

On the other hand, in a case where the sleep mode SW 335 has not been pressed (NO in step S1001), the processing proceeds to step S1003. In step S1003, the CPU 311 determines whether the job has been input. In a case where the job has been input (YES in step S1003), the CPU 311 determines that the job has been received via the network I/F 314 in the sleep mode, and advances the processing to step S1002. In step S1002, the CPU 311 determines the return mode to be the second return mode.

In step S1003, in a case where the job has not been input (NO in step S1003), the processing proceeds to step S1004. In step S1004, the CPU 311 determines the return mode to be a first return mode. In the first return mode, the image forming apparatus returns when the main power switch 336 is turned on.

The return mode determined by the flowchart in FIG. 10 is included in the system information notification C3 of the command communication illustrated in FIG. 9 so that the CPU 301 is notified of the return mode. Further, the determined return mode may be included in the configuration start request C1, for example, so that the CPU 301 is notified of the return mode.

Figure 11:
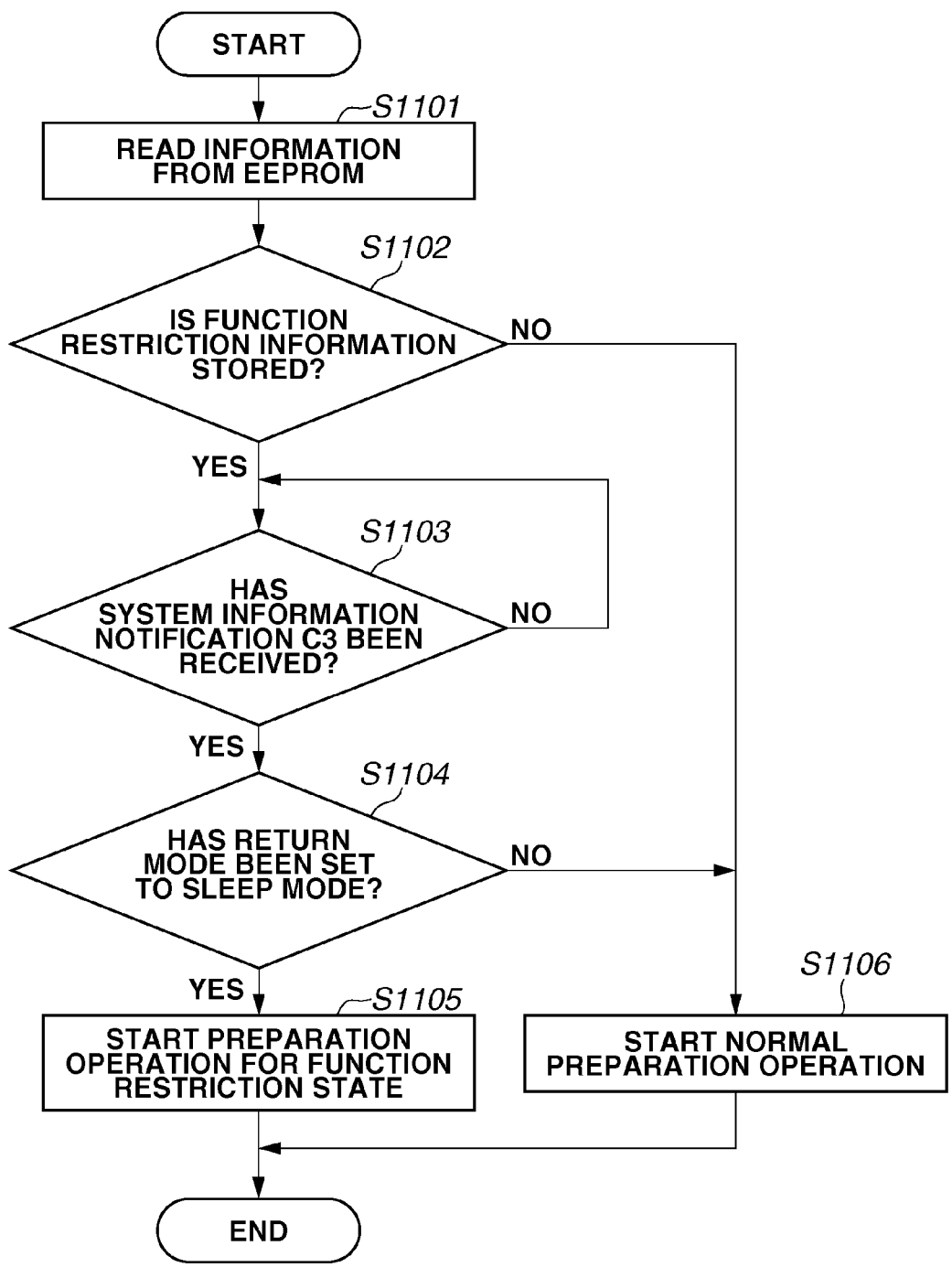
FIG. 11 is a flowchart illustrating an operation of the CPU according to a first exemplary embodiment.

FIG. 11 is a flowchart illustrating an operation of the CPU 301 according to the present exemplary embodiment. A program for executing the flowchart is stored in the ROM 302 so that the program is read and executed by the CPU 301.

In step S1101, when the power SW 362 is turned on to input the power to the CPU 301, the CPU 301 reads the information stored in the EEPROM 304. Then, in step S1102, the CPU 301 determines whether the function restriction information is stored in the EEPROM 304. In a case where the function restriction information is not stored therein (NO in step S1102), the processing proceeds to step S1106.

On the other hand, in a case where the function restriction information is stored therein (YES in step S1102), the processing proceeds to step S1103. In step S1103, the CPU 301 waits until the system information notification C3 is received from the CPU 311. In a case where the CPU 301 is notified of the system information notification C3 (YES in step S1103), the CPU 301 advances the processing to step S1104. In step S1104, the CPU 301 determines whether the return mode is determined to be the second return mode.

In a case where the return mode is determined to be the second return mode (YES in step S1104), the processing proceeds to step S1105. In step S1105, the CPU 301 starts the preparation operation for the function restriction state. For example, in a case where the preparation operation for the function restriction state being caused by the abnormalities of the printer unit 100 is executed, the CPU 301 executes the preparation operation excluding the preparation operation corresponding to the abnormalities of the printer unit 100.

Specifically, as illustrated in Table 2, the CPU 301 executes the preparation operation excluding the respective operations of the high-voltage checking, the high-voltage adjustment, the development unit initial rotation, and the fixing unit startup.

On the other hand, in a case where the return mode is determined to be the first return mode (NO in step S1104), the processing proceeds to step S1106. In step S1106, the CPU 301 starts the normal preparation operation. In other words, as illustrated in Table 2, the CPU 301 executes the preparation operation including the respective operations of the high-voltage checking, the high-voltage adjustment, the development unit initial rotation, and the fixing unit startup.

As described above, according to the present exemplary embodiment, when the image forming apparatus returns from the sleep mode in the function restriction state, it is possible to prevent the failure from getting worse while preventing another failure in other parts.

In a second exemplary embodiment, the CPU 311 notifies the CPU 301 of the return mode through the return mode notification I/O 361 and the return mode reception I/O 363.

In a case where the return mode is determined to be the second return mode in the flowchart of FIG. 10, the CPU 311 turns on the return mode notification I/O 361. On the other hand, in a case where the return mode is determined to be the first return mode in the flowchart of FIG. 10, the CPU 311 turns off the return mode notification I/O 361.

Figure 12:
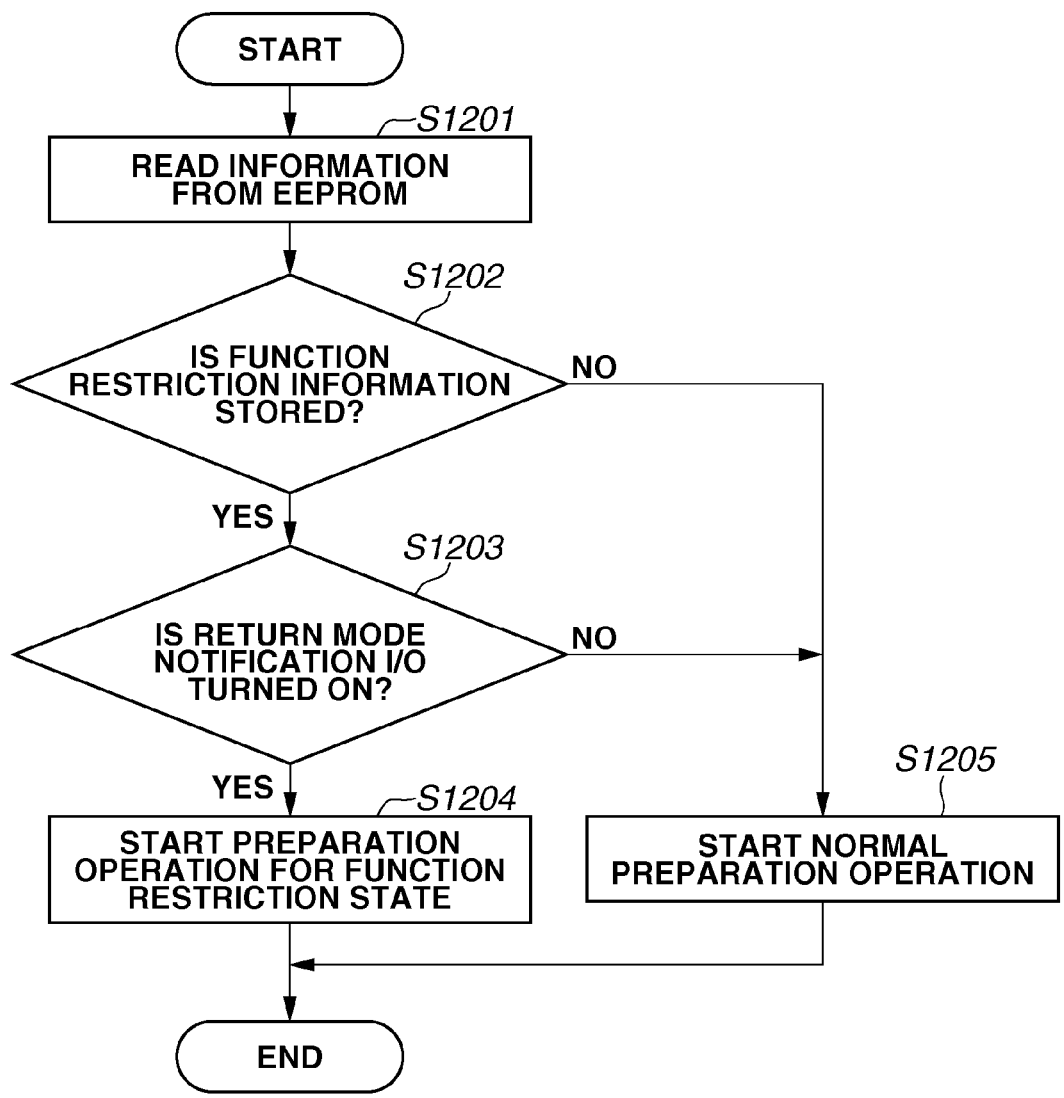
FIG. 12 is a flowchart illustrating an operation of the CPU according to a second exemplary embodiment.

FIG. 12 is a flowchart illustrating an operation of the CPU 301 according to the present exemplary embodiment. A program for executing the flowchart is stored in the ROM 302 so that the program is read and executed by the CPU 301.

In step S1201, when the power SW 362 is turned on to input the power to the CPU 301, the CPU 301 reads the information stored in the EEPROM 304. Then, in step S1202, the CPU 301 determines whether the function restriction information is stored in the EEPROM 304. In a case where the function restriction information is not stored therein (NO in step S1202), the processing proceeds to step S1205.

On the other hand, in a case where the function restriction information is stored therein (YES in step S1202), the processing proceeds to step S1203. In step S1203, the CPU 301 determines whether the return mode notification I/O 361 is turned on. In a case where the return mode notification I/O 361 is turned on (YES in step S1203), the return mode is determined to be the second return mode. Therefore, the CPU 301 advances the processing to step S1204, and in step S1204, the CPU 301 starts the preparation operations for the function restriction state. For example, in a case where the preparation operation for the function restriction state being caused by the abnormalities of the printer unit 100 is executed, as illustrated in Table 2, the CPU 301 executes the preparation operation excluding the respective operations of the high-voltage checking, the high-voltage adjustment, the development unit initial rotation, and the fixing unit startup.

On the other hand, in a case where the return mode notification I/O 361 is turned off (NO in step S1203), the return mode is determined to be the first return mode. Therefore, the CPU 301 advances the processing to step S1205, and in step S1205, the CPU 301 starts the normal preparation operation. In other words, as illustrated in Table 2, the CPU 301 executes the preparation operation including the respective operations of the high-voltage checking, the high-voltage adjustment, the development unit initial rotation, and the fixing unit startup.

In the exemplary embodiments described above, if an error occurs in a part (the fixing unit) of the printer unit 100, the entire printer unit 100 shifts to the function restriction state. However, if an error occurs in any of image forming stations other than that of black, the black image forming station is operable. Therefore, if an error such as failure of a motor configured to drive a photosensitive drum occurs in any of image forming stations of yellow, magenta, and cyan, the printer unit 100 may be configured to shift to a function restriction state in which a color image formation cannot be executed, instead of shifting to a function restriction state in which operations of the entire printer unit 100 are restricted. In such a case, the printer unit 100 can execute a monochrome image formation.

When the printer unit 100 shifts to the function restriction state in which a color image formation cannot be executed, if a return mode is the first return mode, initialization operations for four image forming stations of yellow, magenta, cyan, and black are executed. On the other hand, if a return mode is the second return mode, an initialization operation for the black image forming station is executed while initialization operations for the image forming stations of yellow, magenta, and cyan are not executed.

Thus, when the printer unit 100 returns from the sleep mode in a function restriction state in which a part of functions thereof cannot be executed, unnecessary initialization operations can be avoided.

As described above, according to the present exemplary embodiment, when the image forming apparatus returns from the sleep mode in the function restriction state, it is possible to prevent the failure from getting worse while preventing another failure in other parts.

Furthermore, according to the present exemplary embodiment, instead of using the command sequence illustrated in FIG. 9, a signal line having an excellent real-time property is used to perform direct determination processing. This enables the return mode to be determined more quickly than in the first exemplary embodiment. As a result, downtime of the image forming apparatus can be further reduced.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-073276 filed Mar. 29, 2013 and No. 2014-017771 filed Jan. 31, 2014, which are hereby incorporated by reference herein in their entirety.

What is claimed is:

1. An image forming apparatus capable of selectively executing a plurality of functions, the image forming apparatus comprising:

a first control unit configured to transmit an image forming job;

a second control unit configured to receive the image forming job transmitted from the first control unit and to control an image forming operation;

an abnormality detection unit configured to detect an abnormality of the image forming apparatus;

a function restriction unit configured to restrict, among the plurality of functions, a function corresponding to the abnormality detected by the abnormality detection unit; and an execution unit configured to execute a first preparation operation in a case where a power of the second control unit is turned on when the function is not restricted by the function restriction unit, and to execute, in a case where the power of the second control unit is turned on when the function is restricted by the function restriction unit, a second preparation operation in which a preparation operation corresponding to the restricted function is excluded from the first preparation operation.

2. The image forming apparatus according to claim 1, wherein the first control unit shuts off power supply to the second control unit when the image forming apparatus shifts to a power saving mode.

3. The image forming apparatus according to claim 2, wherein the execution unit executes the second preparation operation in a case where the image forming apparatus returns from the power saving mode when the function thereof is restricted by the function restriction unit.

4. The image forming apparatus according to claim 2,
wherein the first control unit and the second control unit are connected to each other via a communication line, and
wherein information indicating whether the image forming apparatus returns from the power saving mode is included in a communication command and transmitted from the first control unit to the second control unit via the communication line.

5. The image forming apparatus according to claim 4, wherein the execution unit does not execute the first preparation operation or the second preparation operation until the second control unit receives the command that includes the information indicating whether the image forming apparatus returns from the power saving mode.

6. The image forming apparatus according to claim 2,
wherein the first control unit and the second control unit are connected to each other via a signal line, and
wherein information indicating whether the image forming apparatus returns from the power saving mode is transmitted from the first control unit to the second control unit via the signal line.

7. The image forming apparatus according to claim 1, wherein the execution unit executes the first preparation operation in a case where a main power source of the image forming apparatus is turned on when the function thereof is restricted by the function restriction unit.

8. The image forming apparatus according to claim 1, further comprising a storage unit configured to store the function restricted by the function restriction unit,
wherein the execution unit reads information stored in the storage unit when the power is turned on, and determines, based on the read information, which of the first preparation operation and the second preparation operation to execute.

9. An image forming apparatus capable of selectively executing a plurality of functions, the image forming apparatus comprising:
an abnormality detection unit configured to detect an abnormality of the image forming apparatus;
a function restriction unit configured to restrict, among the plurality of functions, a function corresponding to the abnormality detected by the abnormality detection unit; and
a control unit configured to control an initialization operation of the image forming apparatus,
wherein the control unit is configured to execute a first preparation operation in a case where the initialization operation is performed when the function is not restricted by the function restriction unit, and to execute, in a case where the initialization operation is performed when the function is restricted by the function restriction unit, a second preparation operation in which a preparation operation corresponding to the restricted function is excluded from the first preparation operation.

* * * * *